US006966044B2

(12) United States Patent
Reuland et al.

(10) Patent No.: US 6,966,044 B2
(45) Date of Patent: Nov. 15, 2005

(54) METHOD FOR COMPOSING MEMORY ON PROGRAMMABLE PLATFORM DEVICES TO MEET VARIED MEMORY REQUIREMENTS WITH A FIXED SET OF RESOURCES

(75) Inventors: Paul G. Reuland, Rochester, MN (US); George W. Nation, Eyota, MN (US); Jonathan Byrn, Kasson, MN (US); Gary S. Delp, Rochester, MN (US)

(73) Assignee: LSI Logic Corporation, Milpitas, CA (US)

( * ) Notice: Subject to any disclaimer, the term of this patent is extended or adjusted under 35 U.S.C. 154(b) by 48 days.

(21) Appl. No.: 10/316,101

(22) Filed: Dec. 9, 2002

(65) Prior Publication Data

US 2004/0111690 A1 Jun. 10, 2004

(51) Int. Cl.[7] .............................................. G06F 17/50
(52) U.S. Cl. ............................. 716/17; 716/1; 716/19; 716/20
(58) Field of Search .......................... 365/201, 185.12, 365/185.11; 716/1, 4, 6, 17, 19, 20; 326/40

(56) References Cited

U.S. PATENT DOCUMENTS 4,656,592 A 4/1987 Spaanenburg et al.
5,406,525 A 4/1995 Nicholes
5,818,728 A 10/1998 Yoeli et al.
5,818,729 A 10/1998 Wang et al.
5,912,850 A * 6/1999 Wood et al. ................ 365/201
6,459,136 B1 10/2002 Amarilio et al.
6,510,081 B2 * 1/2003 Blyth et al. ............ 365/185.12
6,529,040 B1 * 3/2003 Carberry et al. .............. 326/40
6,552,410 B1 4/2003 Eaton et al.
2004/0027856 A1 * 2/2004 Lee et al. .............. 365/185.11

FOREIGN PATENT DOCUMENTS

JP 01202397 7/2001
JP 02202886 7/2002

OTHER PUBLICATIONS

"RapidChip Semiconductor Platform", LSI Logic Corporation, XP002304387, Dec. 1, 2002, pp. 1-5.
"A 200ps 0.5 CMOS Gate Array Family with High Speed Modules", Nishio et al., Asic Conference and Exhibit, Seventh Annual IEEE International, Sep. 19-23, 1994, XP010140512, pp. 112-115.
"Memorist: A Diffused CMOS SRAM Compiler for Gate Array Applications", Tou et al., Asic Conference and Exhibit, Fourth Annual IEEE International, Sep. 23-27, 1991, XP010048528, pp. P14-8.1-P14-8.4.

* cited by examiner

*Primary Examiner*—Thuan Do
(74) *Attorney, Agent, or Firm*—Christopher P. Maiorana, P.C.

(57) ABSTRACT

A method for composing memory on a programmable platform device comprising the steps of: (A) accepting information about a programmable platform device comprising one or more diffused memory regions and one or more gate array regions; (B) accepting predetermined design information for one or more memories; and (C) composing one or more memory building blocks (i) in the one or more diffused memory regions, (ii) in the one or more gate array regions or (iii) in both the diffused memory and the gate array regions based upon the predetermined design information and the information about the programmable platform device.

20 Claims, 9 Drawing Sheets

METHOD FOR COMPOSING MEMORY ON PROGRAMMABLE PLATFORM DEVICES TO MEET VARIED MEMORY REQUIREMENTS WITH A FIXED SET OF RESOURCES

FIELD OF THE INVENTION

The present invention relates to Very Large Scale Integrated (VLSI) circuit design technology generally and, more particularly, to a method for composing memory on programmable platform devices to meet varied memory requirements with a fixed set of resources.

BACKGROUND OF THE INVENTION

Programmable platform architectures for Very Large Scale Integrated (VLSI) circuit designs provide a fixed set of resources for implementing different custom logic designs applied to the platform. Embedded memory is one such resource. The embedded memory requirements of different custom logic designs to be applied to the same programmable platform device can be quite different.

In conventional solutions, standard size embedded memory blocks are provided by the programmable platform device. The blocks are combined to create a desired memory width and depth. The conventional solutions suffer from a lack of flexibility. The designer of the circuit to be fabricated on the programmable platform device has very little flexibility in the customized use of the embedded arrays. The chip designer can only use the resources provided in the restricted mode that has been implemented by the platform designer. A situation can occur where the chip designer does not have the resources to use a memory in an organization best suited to the application.

Conventional solutions also waste die real estate. Combining embedded memory arrays of a preset size can lead to wasted die area. For example, creating a 256×50 array by combining two available 256×40 arrays wastes 75% of the second array. Conventional solutions can also result in late timing information feedback. The effect of the interconnection delay on the timing of the random access memory is not discovered until full chip timing tests can be made, which is usually late in the design process. When working to minimize the time to design a custom logic chip, the earlier in the process that accurate design constraints can be provided to the designer, the simpler (and quicker) relevant design tradeoffs between choices can be made. When accurate information is available only later in the process, significant rework can be necessary, essentially restarting the design with new constraint information, thus negating the progress made under the inaccurate assumptions.

It would be desirable to provide an embedded memory solution that may fulfill the memory size and performance specifications of different designs using a fixed set of resources.

SUMMARY OF THE INVENTION

The present invention concerns a method for composing memory on a programmable platform device generally comprising the steps of (A) accepting information about a programmable platform device comprising one or more diffused memory regions and one or more gate array regions; (B) accepting predetermined design information for one or more memories; and (C) composing one or more memory building blocks (i) in the one or more diffused memory regions, (ii) in the one or more gate array regions or (iii) in both the diffused memory and the gate array regions based upon the predetermined design information and the information about the programmable platform device.

The objects, features and advantages of the present invention include providing a method for composing memory on programmable platform devices to meet varied memory criteria with a fixed set of resources that may (i) provide the ability to compose memories from a combination of fixed block diffused memory and gate array memory resources, (ii) provide the ability to include physical ram and logic information in the memory composition process, (iii) provide an automated tool to perform the memory composition methodology, (iv) provide for high flexibility to allow a much wider and richer set of memory combinations to be available to the chip designer, (v) provide for higher density over conventional methods through the intelligent composition of integrated circuit memory resources that reduces wasted silicon, (vi) allow for performance feedback by providing an early view of memory timing performance based on the integrated circuit physical information; (vii) reduce costly redesign late in the design cycle, and/or (viii) provide automated generation of RTL views.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
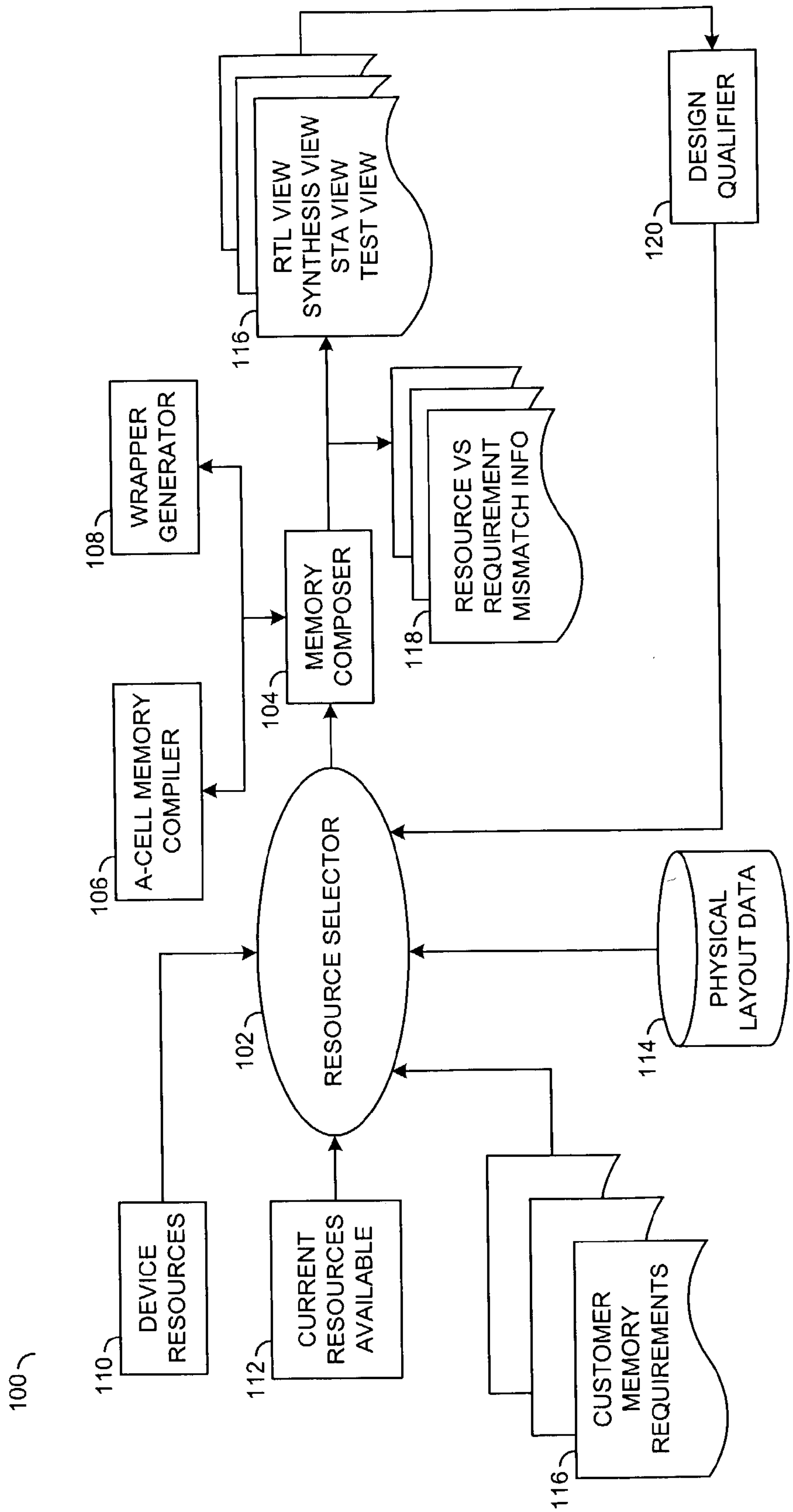
FIG. 1 is a flow diagram illustrating a preferred embodiment of the process of the present invention.

Referring to FIG. 1, a flow diagram of a process 100 is shown in accordance with a preferred embodiment of the present invention. The process 100 may comprise a stage 102, a stage 104, a stage 106 and a stage 108. The stage 102 may be implemented as a resource selector. The stage 104 may be implemented as a memory composer. The stage 106 may be implemented as a gate array (or A-cell) memory compiler. The stage 108 may be implemented as a wrapper generator.

The resource selector 102 may be configured, in one example, to compare (i) information about device resources (e.g., the block 110), (ii) information about current availability of the device resources (e.g., the block 112) and (iii) physical layout data (e.g., the block 114) of the programmable platform device with memory specifications of a customer (e.g., the block 116). The resource selector 102 generally determines which resources of the programmable platform device are devoted to composing a particular memory or memories specified by the customer. The resource selector 102 generally passes the resource selection (or allotment) information to the memory composer 104.

The memory composer 104 generally generates (or manages the configuration of) various memory shells to satisfy the customer specifications.

The comparison and allocation of resources is generally performed based on a combination of specifications that may be applied to optimize the design. These specifications may, for example, include: User preferences (e.g., the user may chose to instruct the tool as to which resource gets allocated to which memory requirement); Change minimization (e.g., the allocation may be made in a way to minimize change to a nearly complete design); Timing Considerations (e.g., the allocation may be made to most closely match timing requirements to the speed of available resources); Location or Routing Congestions (e.g., the allocation may be made to minimize distance from memory to associated logic, that may improve timing and reduce routing congestion); Density (e.g., the allocation may be made to generate and/or optimize memory density, that may minimize the required chip silicon area).

The device resources 110 generally include composable memory elements comprising, for example, (i) non-pipelined diffused memory, (ii) pipelined diffused memory, (iii) non-pipelined gate array based memory, and/or (iv) pipelined gate array based memory. The non-pipelined diffused memory may be implemented, in one example, as bit cell based diffused memory. The pipelined diffused memory may be implemented, in one example, as diffused memory with stages of flip-flops, registers and/or latches on the memory inputs and/or outputs. The flip-flops, registers and/or latches may be configured for functional or timing purposes. The non-pipelined gate array based memory may be implemented, in one example, as memory built upon sea of gate array elements (e.g., A-cells) on the programmable platform device. The pipelined gate array based memory may be implemented, in one example, as gate array based memory with stages of flip-flops, registers and/or latches on the memory inputs and/or outputs. The flip-flops, registers and/or latches may be configured for functional or timing purposes.

The memory composer 104 may be configured to accept a plurality of inputs from the resource selector 102. For example, the plurality of inputs from the resource selector 102 may comprise customer logic specification inputs, chip resources allotted, and/or physical placement data. However, other inputs may be implemented accordingly to meet the design criteria of a particular implementation. The customer logic specification inputs may comprise, for example, memory performance specifications (e.g., cycle time, access time, etc.), memory dimensions (e.g., array width and depth), number and type of ports in the memory (e.g., single port, dual port, etc.), memory latency, and/or memory power consumption specifications. The chip resources allotment inputs may comprise, for example, type of resource allotted (e.g., diffused memory or gate array memory), the amount of resources allotted, etc. The physical placement data inputs may comprise, in one example, the physical placement of resources and the physical placement of logic accessing the memory. However, other resource selection information (or inputs) may be implemented accordingly to meet the design criteria of a particular implementation.

The memory composer 104 may be configured to provide a plurality of outputs 116. The outputs 116 may comprise, in one example, an RTL view of the generated memory (or memories), synthesis scripts for the generated memory and associated wrappers, static timing scripts for the generated memory and the associated wrappers, and/or a memory built-in self test (BIST) test wrapper (e.g., logic vision compatible). The memory composer 104 may provide basic error checking feedback. For example, the memory composer 104 may be configured to provide information regarding mismatches between resources and customer specifications (e.g., the block 118). For example, the memory composer 104 may be configured to detect and indicate problems such as the timing of a random access memory (RAM) in combination with the interconnection delay and the delay inserted by the wrapper elements being insufficient to meet the customer specifications. The memory composer 104 generally provides an early view of memory timing performance based on the physical information of the chip. By providing the early view of the timing performance, the present invention may reduce or eliminate costly redesign later in the design cycle.

The memory composer 104 generally provides a number of memory composition features. For example, the memory composition features may comprise gross memory solution checking, a number of single port memory compositions and a number of multi-port memory compositions. Gross memory solution checking may comprise analysis of, in one example, customer performance specification versus composed memory performance. Such an analysis may include, for example, a calculation of an interconnect delay from physical placement information and/or additional delay inserted by the wrapper elements (e.g., test and functional wrapper).

Referring to FIGS. 2(A–F), block diagrams of various example memory compositions are shown. The memory composer 104 may be configured to generate a number of single port memory compositions. For example, the memory composer 104 may provide a one port memory from (i) a single diffused memory (e.g., FIG. 2A), (ii) multiple diffused memories (e.g., FIGS. 2B and 2C), (iii) gate array memory (e.g., FIG. 2D), (iv) a combination of diffused memory and gate array memory (e.g., FIGS. 2B and 2C) and (v) multiple one port memories from a single one port memory (e.g., time division multiplexing a single faster memory to provide multiple slower memories). In one example, extra data bits and/or address bits may be tied off in the wrapper (e.g., FIG. 2E). Tying off the extra data and/or address bits generally provides a test friendly composition. In general, the memory composer 104 may be configured to generate each of the single port compositions with one or more pipeline stages on the memory inputs and/or outputs (e.g., the flip-flops of FIGS. 2A–2D).

The memory composer 104 may be configured to generate a number of multi-port memory compositions. For example, the memory composer 104 may provide a two port memory from (i) a double wide combination of single port memories, (ii) a double clocked combination of single port memories, (iii) a single diffused dual port memory (e.g., FIG. 2F), (iv) multiple diffused dual port memories, (v) gate array memory (e.g., FIG. 2D), (vi) a combination of diffused memory and gate array memory, and/or (vii) multiple two port memories from a single two port memory by time division multiplexing to slow memory specifications with a single faster memory. In general, the memory composer 104 may be configured to generate each of the multi-port compositions with one or more pipeline stages on the memory inputs and/or outputs (e.g., the flip-flops in FIG. 2F).

Figure 2A:
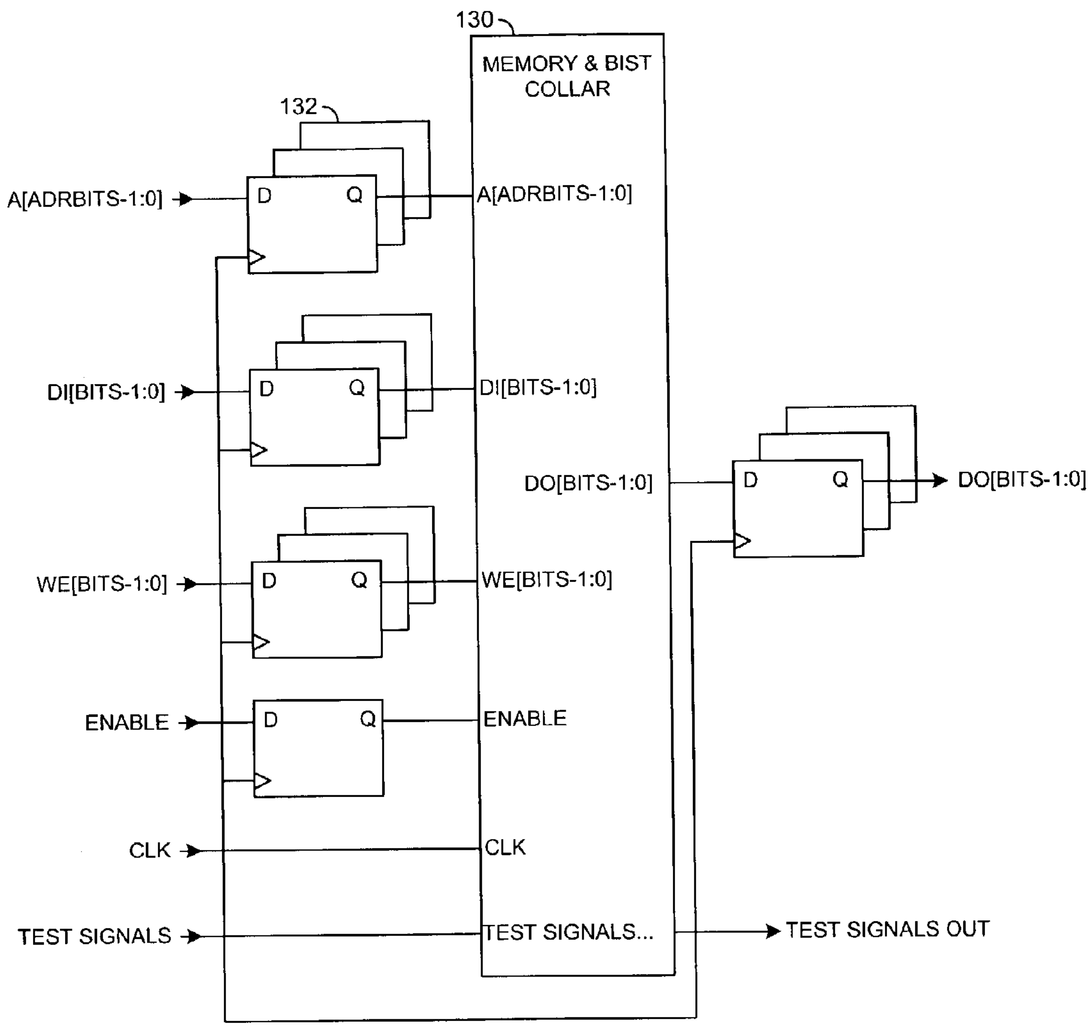
FIGS. 2(A–F) are diagrams illustrating example memory compositions.

Referring to FIG. 2A, a basic single port diffused memory 130 is shown. The memory 130 may include a memory test wrapper (e.g., BIST collar). The memory 130 may be implemented as pipelined or non-pipelined. When the memory is used in a pipelined implementation, a wrapper may be generated containing the pipeline flip-flops 132. If the memory is used without the pipeline flip-flops 132, the wrapper may be generated for port renaming and/or tie off block insertion (described in more detail in connection with FIG. 2E).

Figure 2B:
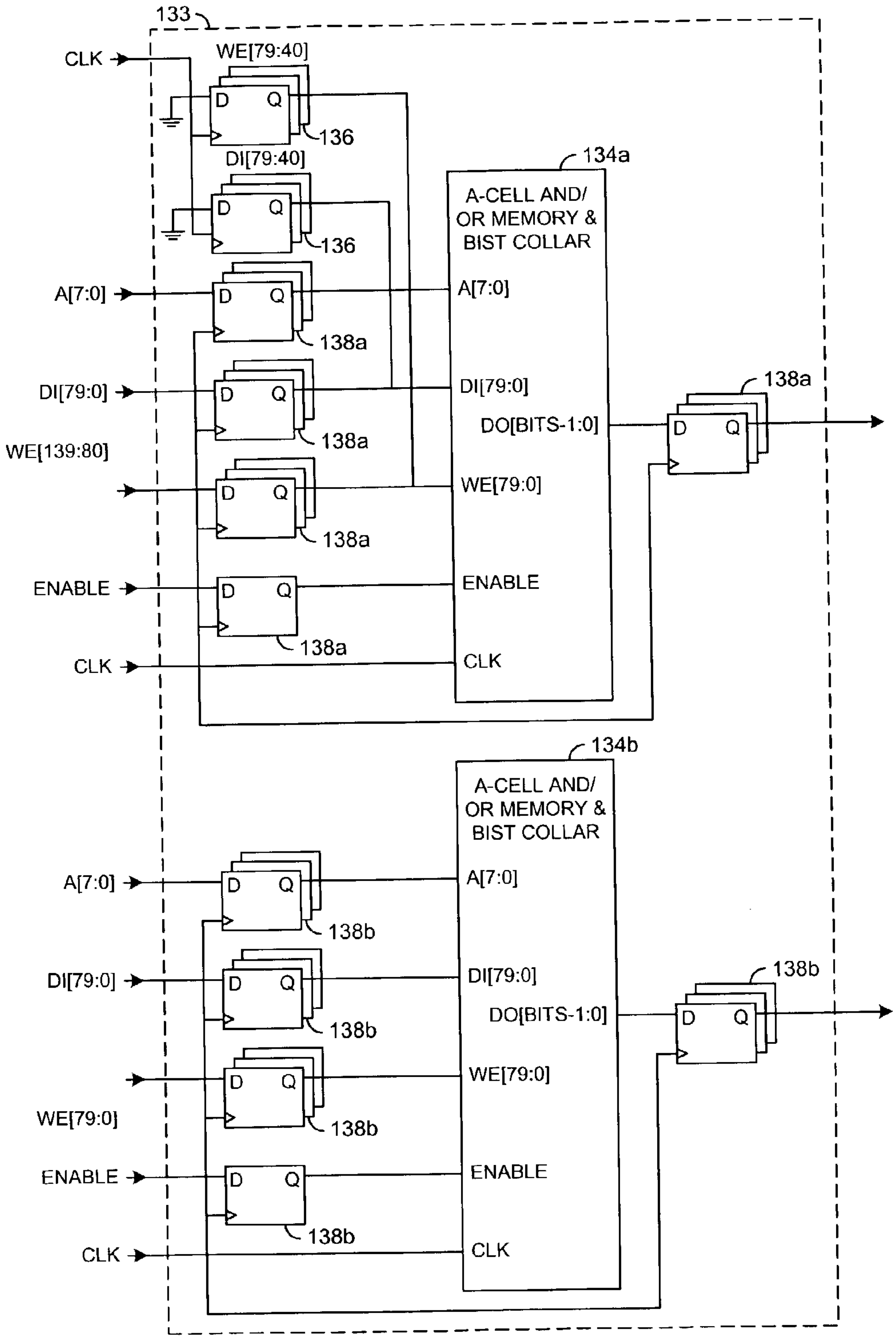

Referring to FIG. 2B, a block diagram illustrating an example combination of multiple memories for increased memory width is shown. Each of the memories may be implemented as diffused memory, gate array memory or a combination of diffused and gate array memories. In one example, a 256×140 memory 133 may be composed from two 256×80 memories 134*a* and 134*b*. Because the size of the composed memory is larger than the specified memory, a number of the inputs may be tied off with tie off flip-flops 136. When the memories 134*a* and 134*b* are to be used as pipelined memories, a wrapper may be generated containing pipeline flip-flops 138*a* and 138*b*. Logically, a single set of flip-flops may be implemented to store the address bits for the memory. However, the memories 134*a* and 134*b* may not be located close together on the die. In such a case, separate banks of flip-flops may be implemented.

Figure 2C:
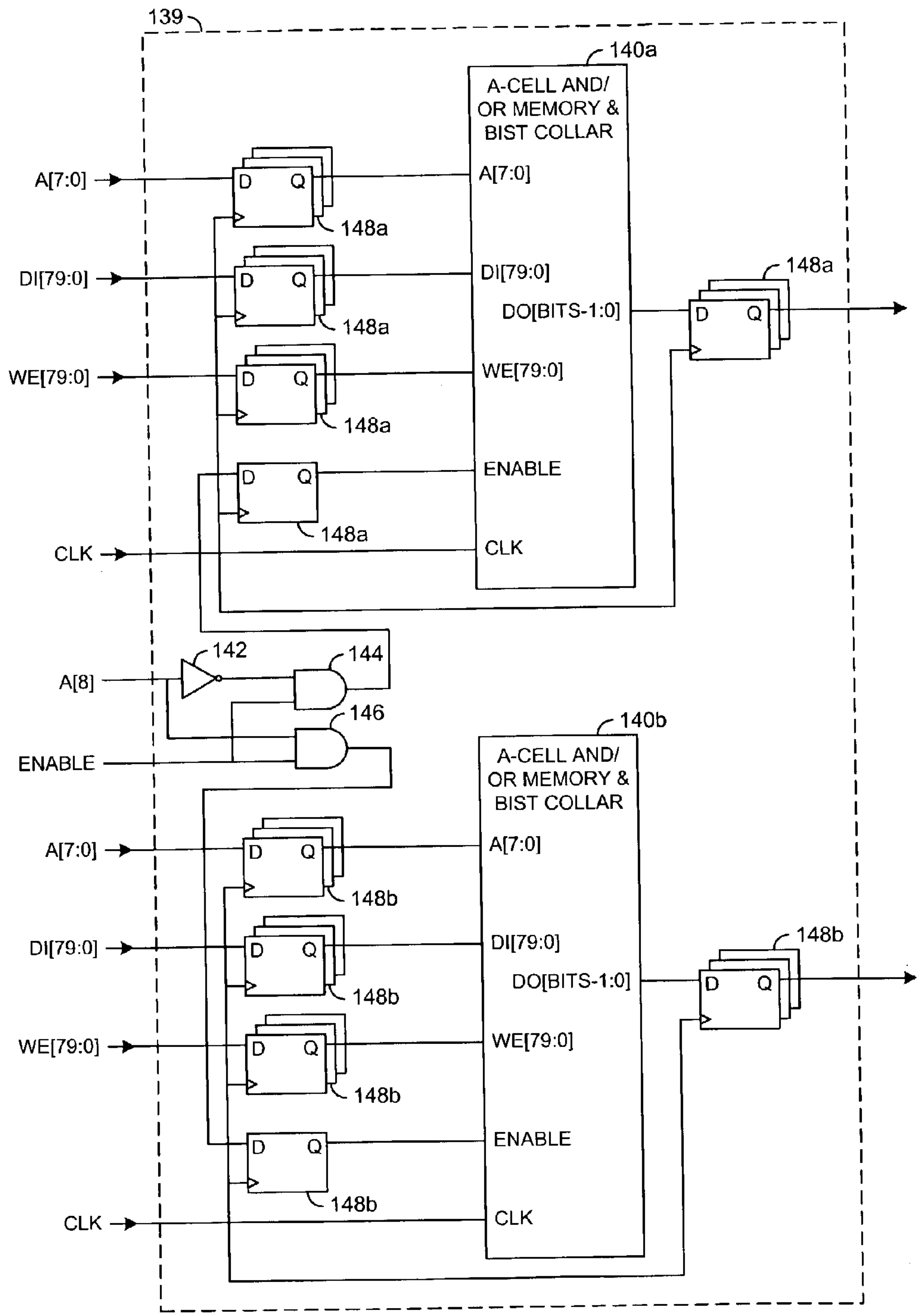

Referring to FIG. 2C, a block diagram illustrating a combination of multiple memories composed for increased memory depth is shown. The memories may be composed from diffused memory blocks, gate array memory blocks or a combination of diffused and gate array memory blocks. In general, when the physical memory composed has more rows than the specified number, the wrapper may resolve the address to a power of two boundary. For example, if a 128×80 memory is composed from a 256×80 memory, the upper address bit may be tied off. However, if a 200×80 memory is composed from a 246×80 memory, there will generally be no additional address logic in the wrapper (e.g., the user may have the capability of addressing beyond the intended range without an error indication).

In one example, a 512×80 memory 139 may be composed from two 256×80 memories 140*a* and 140*b*. Each of the memories 140*a* and 140*b* may include a memory test wrapper (e.g., BIST collar). A wrapper for the memory may comprise logic (e.g., logic gates 142, 144 and 146) for generating an enable signal for each of the memories based on the high address bit. If the composed memory is to be pipelined, the wrapper may include pipeline flip-flops 148*a* and 148*b*.

Figure 2D:
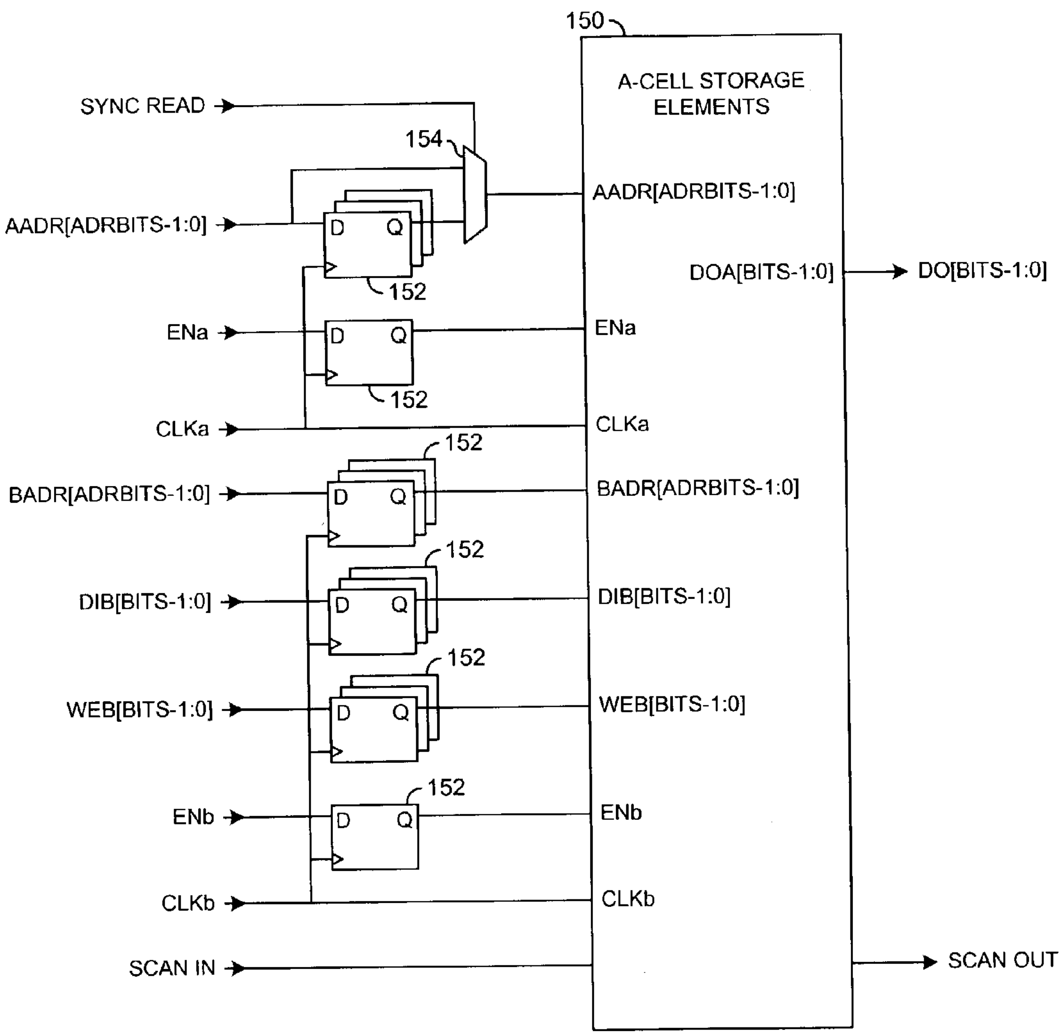

Referring to FIG. 2D, a block diagram illustrating an example gate array memory is shown. The gate array memory may be implemented with A-cell storage elements 150. If the gate array memory is to be used as a pipeline memory, pipeline flip-flops 152 may be implemented in the wrapper. The gate array memory wrapper may also comprise a multiplexer 154 that may control whether the memory is accessed synchronously or asynchronously.

Figure 2E:
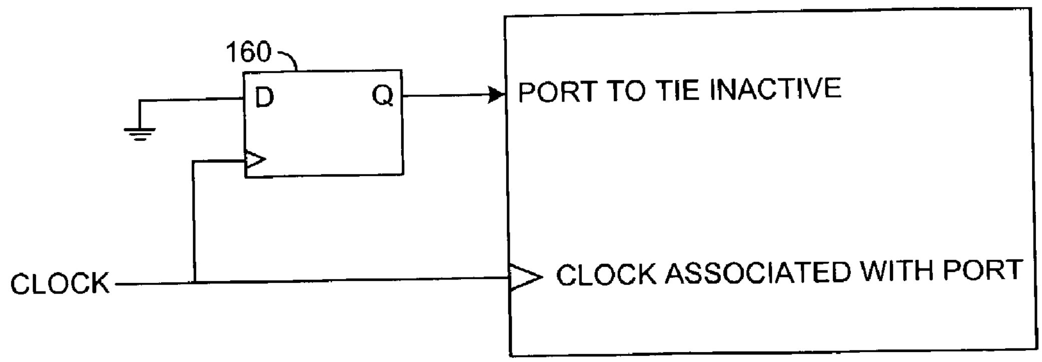

Referring to FIG. 2E, a block diagram illustrating a tie off structure for inactive ports of a memory is shown. In one example, unused address, data and read/write enable bits may be tied inactive. A tie off is generally done in a controlled manner to enable manufacturing test logic around the tie off. For example, a tie off flip-flop 160 may be implemented to present a known signal to the inactive port.

Figure 2F:
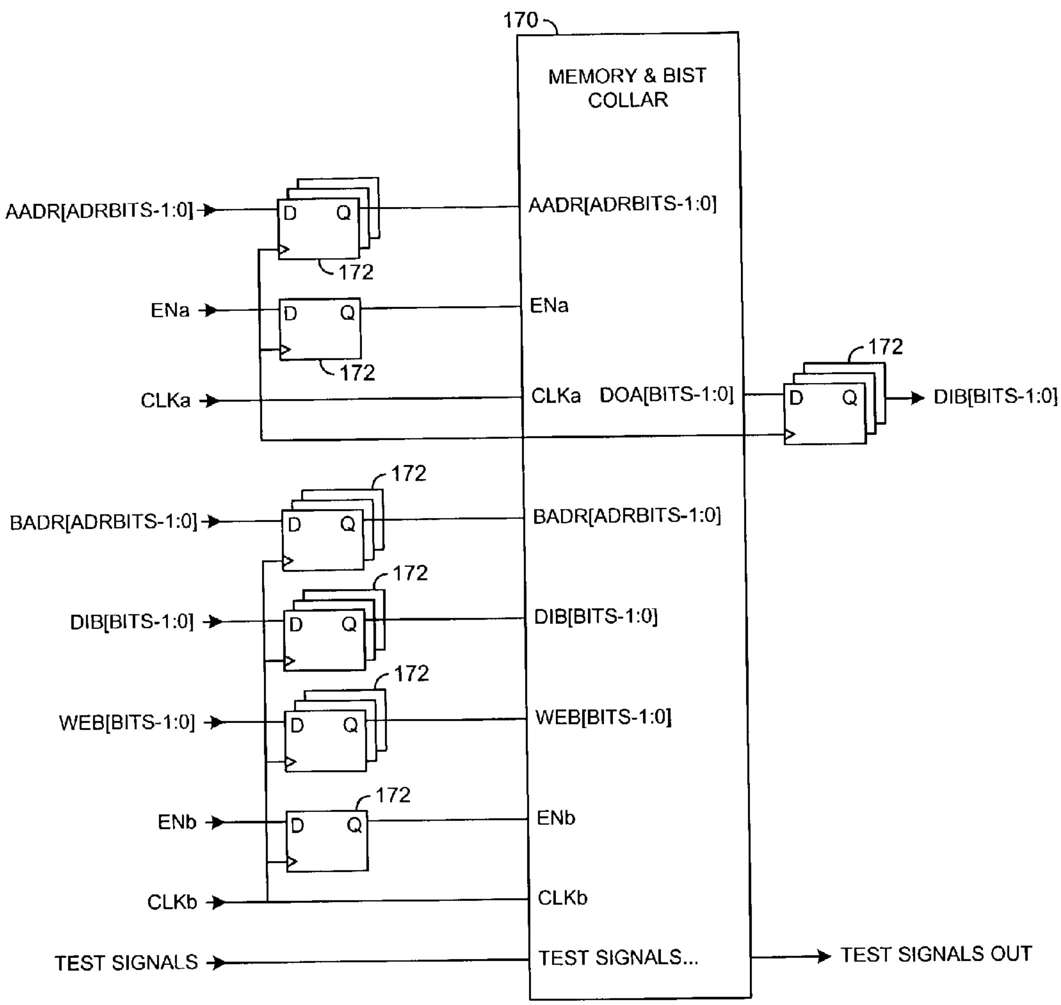

Referring to FIG. 2F, a block diagram illustrating a dual port memory is shown. A dual port memory 170 may include a memory test wrapper (e.g., BIST collar). Depending on whether the memory 170 is composed for a non-pipelined or pipelined application, a wrapper may be generated containing pipeline flip-flops 172. The wrapper may also comprise tie off blocks (not shown).

Referring back to FIG. 1, the gate array memory compiler 106 may be implemented, in one example, as a standard memory compiler. In one example, the gate array memory compiler 106 may be implemented as an A-cell memory compiler. The gate array memory compiler 106 generally receives a row number, a column number, and a number of ports as inputs and generates a gate array memory. The memory composer 104 generally takes the information provided by the resource selector 102, provides basic checking of the ability to perform the requested operation based on the resources selected, and coordinates the specific tools for providing the memory composition specified. For example, the memory composer 104 may send information to the gate array memory compiler 106 to generate a specified A-cell based memory. The A-cell memory compiler 106 generally generates a memory based on the provided information. The output of the memory compiler 106 generally includes all of the views (e.g., rtl, timing, physical layout, etc.) for use of the generated memory. The output of the gate array memory compiler 106 may be used, in one example, either i) as generated in the case of a request for a single memory based on A-cells or (ii) in combination with the memory views of other memories, such as diffused memory, to create a more complex combination of multiple memories.

Figure 3:
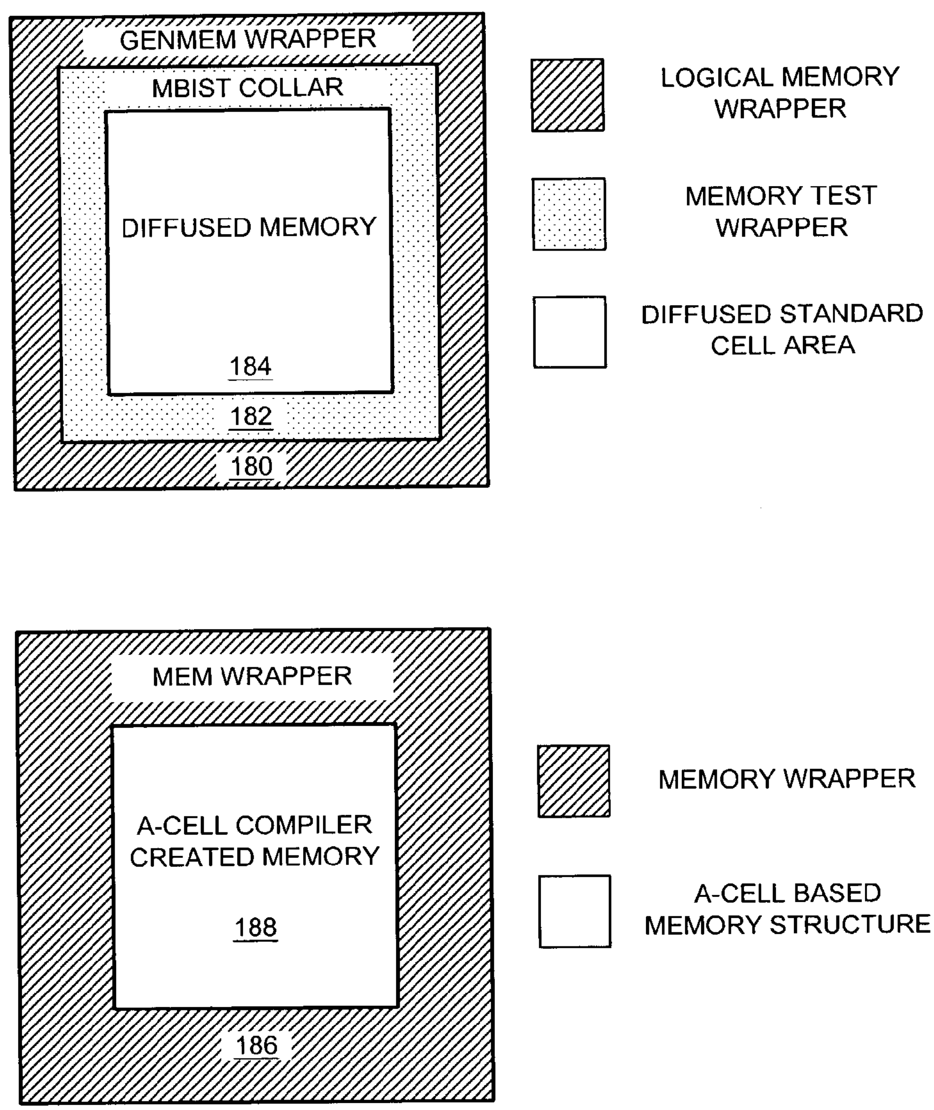
FIG. 3 is a diagram illustrating example memories and wrappers.

Referring to FIG. 3, a block diagram illustrating example wrappers that may be generated by the wrapper generator 108 of FIG. 1 is shown. The wrapper generator 108 may be configured to generate, based on the type of memory being implemented, RTL code for the pipeline stages, input and output multiplexing, tie off blocks and test structures (described in more detail above in connection with FIGS. 2 (A–F)) requested by the memory composer 104. As described above, the memory composer 104 is generally configured to take the information provided by the resource selector 102, provide basic checking of the ability to perform the user specified operation based on the resources selected, and manage the specific tools required to provide the memory composition specified. Based on the memory generated (e.g., from A-cells, diffused memory, or combinations of both), the wrapper generator 108 generally provides (or builds) a wrapper that encapsulates the generated memory (e.g., a logical memory wrapper 180 and memory test wrapper 182 for a diffused memory 184 and/or a memory wrapper 186, for an A-cell memory 188). The wrapper generator is generally configured to satisfy any pipeline stage requests, generate proper test wrappers for the memory, provide the proper user view (e.g., tie off unused data and address bits) and perform other possible advanced wrapper functions (e.g., ecc, parity checking/generation, etc.).

The process 100 may further comprise a design qualifier stage 120. The design qualifier 120 may be configured to determine whether the outputs of the memory composer 104 meet the specifications of the customer. When the outputs of the memory composer 104 do not meet the specifications of the customer (e.g., based on predetermined criteria of the customer), the design qualifier may pass information to the resource selector that may result in a new allotment of the available resources.

Figure 4:
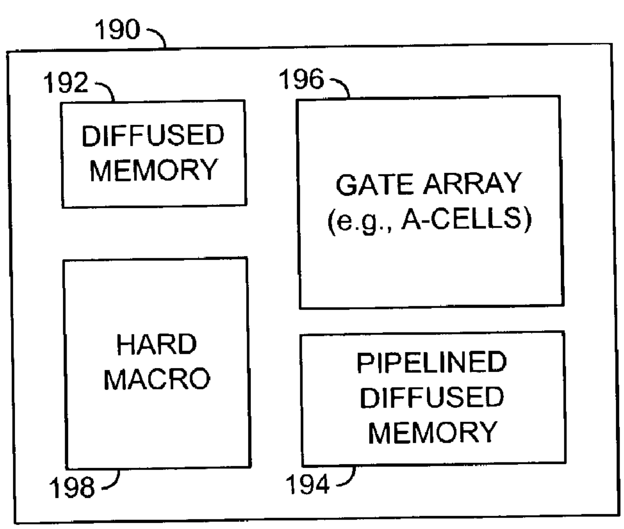
FIG. 4 is a block diagram of a programmable platform device in accordance with a preferred embodiment of the present invention.

Referring to FIG. 4, a block diagram of a programmable platform device (or die) 190 is shown in accordance with a preferred embodiment of the present invention. The device 190 generally comprises one or more regions of diffused memory 192, one or more regions of pipelined diffused memory 194, and one or more diffused regions 196. The regions 192, 194, and 196 may be distributed around the die 190. The diffused regions 196 may be customized, in one example, as logic and/or memory. For example, the regions 196 may be implemented as a sea of gates array. In one example, the regions 196 may be implemented with a number of A-cells. As used herein, A-cells generally refer to an area of silicon designed (or diffused) to contain one or more transistors that have not yet been personalized (or configured) with metal layers. Wire layers may be added to the A-cells to make particular transistors, logic gates and/or storage elements. An A-cell generally comprises one or more diffusions for forming the parts of transistors and the contact points where wires may be attached in subsequent manufacturing steps (e.g., to power, ground, inputs and outputs).

In general, the A-cells may be, in one example, building blocks for logic and/or storage elements. For example, one way of designing a chip that performs logic and storage functions may be to lay down numerous A-cells row after row, column after column. A large area of the chip may be devoted to nothing but A-cells. The A-cells may be personalized (or configured) in subsequent production steps (e.g., by depositing metal layers) to provide particular logic functions. The logic functions may be further wired together (e.g., a gate array design).

The device 190 may comprise one or more hard macros 198. The hard macros 198 may include diffused patterns of a circuit design that is customized and optimized for a particular function. The hard macros generally act much like an ASIC design. For example, a high speed interface may be routed into the hard macro. The hard macro may be configured to perform signal processing to correctly receive the interface and correct for any errors that may be received at the interface, according to the levels of the interface protocol. In general, hard macros may be implemented to provide a number of functions on the device 190. For example, the hard macros 198 may comprise phase locked loops (PLLs), instances of processors, memories, input/output PHY level macros, etc.

Figure 5:
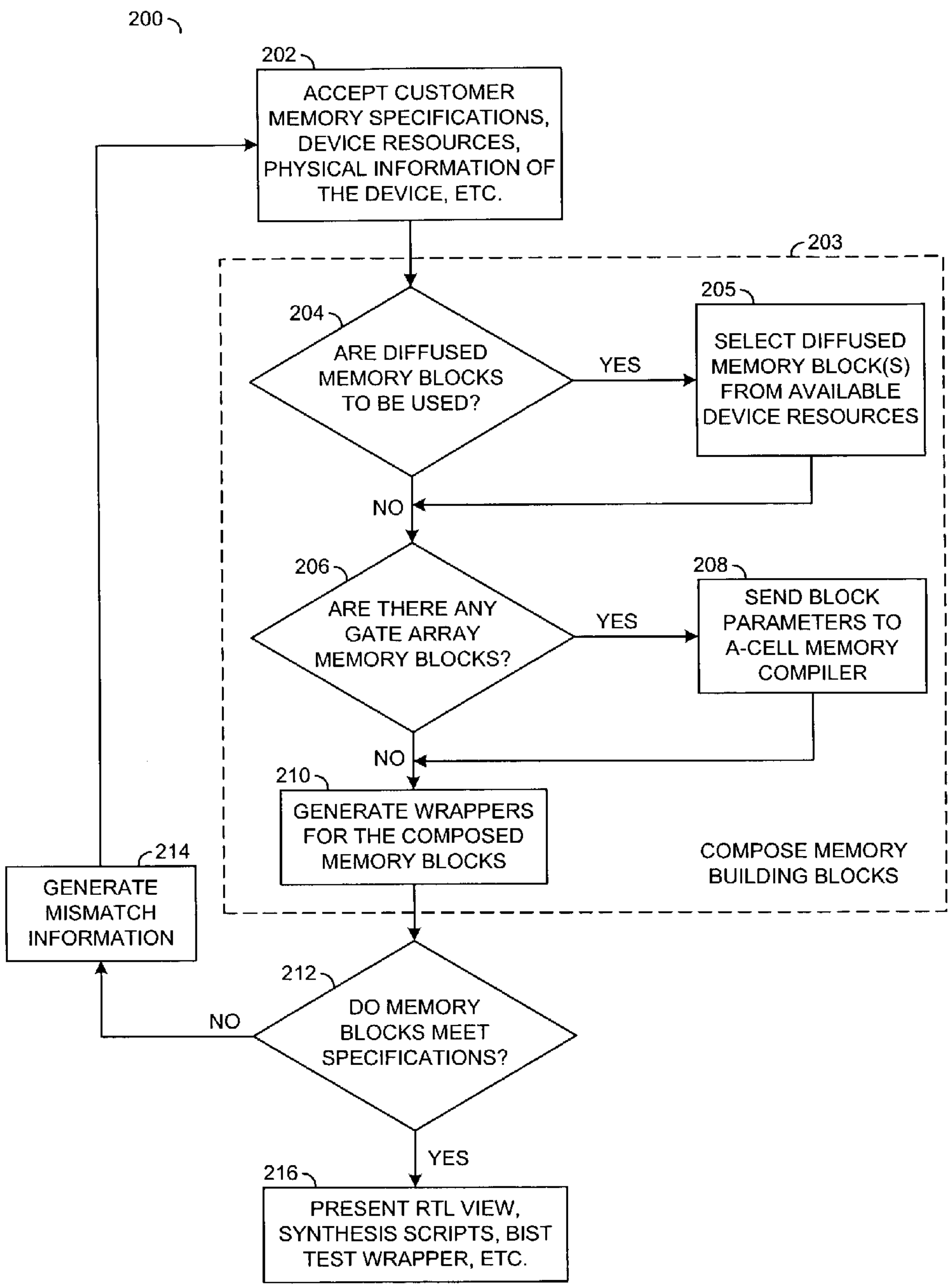
FIG. 5 is a flow diagram of a memory composer stage of FIG. 1.

Referring to FIG. 5, a flow diagram of a process 200 is shown illustrating an example operation of the memory composer 104. The process 200 may begin by accepting customer specifications for memory to be implemented on the programmable platform device, allotted and available device resources, physical placement information, etc. (e.g., the block 202). The process 200 generally continues by composing a number of memory building blocks (e.g., diffused memory blocks and/or gate array based memory blocks) that may be assembled to meet the customer memory specifications (e.g., the block 203). When diffused memory based memory blocks are to be included to meet the memory specification, the memory composer 104 is generally configured to select one or more diffused memory blocks from the available resources of the device (e.g., the blocks 204 and 205). When gate array based memory blocks are to be implemented, the parameters (e.g., rows, columns, number of ports, etc.) for each gate array based memory block are generally sent to a gate array (or A-cell) memory compiler (e.g., the blocks 206 and 208).

When the building blocks have been generated, the process may continue by generating RTL code for any pipeline stages, inputs, outputs, multiplexers and/or test structures associated with the types of memories in the customer specifications (e.g., the block 210). The process 200 may perform basic error checking on the compositions (e.g., the block 212). If the compositions do not meet the specifications (e.g., the NO path from the block 212), the process may provide mismatch information (e.g., the block 214). When all of the memories specified have been composed and meet the specifications, the process 200 may present a number of outputs (e.g., the block 216).

In general, the present invention provides a process and architecture to facilitate composing memory building blocks that may be assembled (e.g., customized with one or more metal routing layers) during circuit fabrication to satisfy varied memory specifications based on a fixed set of resources. Using a fixed set of resources for many different designs is generally advantageous. From the point of view of inventory control of the uncustomized slices, the present invention may provide lowered costs and reduced slice design time. From the point of view of the designer the present invention may provide a wider range of platform choices. From the point of view of the platform provider, the present invention may provide a wider addressed market.

Incorporating test automation and debugging access into the automated path may have an advantage of providing right-by-construction test wrappers with very low designer investment. The present invention may provide regular test structures that may allow test program generation to occur outside of the critical path (e.g., the test program may be produced in parallel with the production of the mask sets and silicon, rather than having to be completed before the expensive mask sets are produced).

While the invention has been particularly shown and described with reference to the preferred embodiments thereof, it will be understood by those skilled in the art that various changes in form and details may be made without departing from the spirit and scope of the invention.

What is claimed is:

1. A method for composing memory on a programmable platform device comprising the steps of:

(A) accepting information about a programmable platform device comprising one or more diffused memory regions and one or more gate array regions;

(B) accepting predetermined design information for one or more memories, wherein said predetermined design information comprises one or more of memory performance parameters, dimensions of said one or more memories, number of ports on each of said one or more memories, latency parameters, and power specifications; and (C) composing one or more memory building blocks (i) in said one or more diffused memory regions, (ii) in said one or more gate array regions or (iii) in said one or more diffused memory regions and said one or more gate array regions based upon said predetermined design information and said information about the programmable platform device.

2. The method according to claim 1, further comprising the step of:

assembling said memory building blocks into said one or more memories according to said predetermined design information.

3. The method according to claim 1, further comprising:

generating one or more wrappers for said one or more memories.

4. The method according to claim 1, wherein step (C) comprises:

generating one or more RTL views for said one or more memories.

5. The method according to claim 1, wherein step (C) comprises:

generating one or more synthesis scripts for said one or more memories.

6. The method according to claim 5, wherein step (C) further comprises:

generating one or more synthesis scripts for one or more wrappers associated with said one or more memories.

7. The method according to claim 1, wherein step (C) comprises:

generating one or more static timing scripts for said one or more memories.

8. The method according to claim 7, wherein step (C) further comprises:

generating one or more static timing scripts for one or more wrappers associated with said one or more memories.

9. The method according to claim 1, wherein step (C) further comprises:

generating one or more built-in self test (BIST) wrappers for said one or more memories.

10. The method according to claim 1, wherein said information about said programmable platform device comprises resource types available.

11. The method according to claim 10, wherein said information about said programmable platform device further comprises an amount of said resource types allotted.

12. The method according to claim 1, wherein said information about said programmable platform device comprises physical placement data.

13. The method according to claim 12, wherein said physical placement data comprises placement of resources.

14. The method according to claim 13, wherein said physical placement data further comprises placement of logic configured to access said memories.

15. The method according to claim 1, wherein:

step (A) comprises accepting information on resource types, amount of resources allotted, physical placement of resources and physical placement of logic accessing said one or more memories.

16. The method according to claim 1, wherein step (C) comprises (i) either or both of selecting one or more diffused memory blocks and compiling one or more gate array memory blocks and (ii) generating one or more wrappers for said one or more memory building blocks.

17. A method for composing memory on a programmable platform device comprising the steps of:

means for accepting information about a programmable platform device comprising one or more diffused memory regions and one or more gate array regions;

means for accepting predetermined design information for one or more memories, wherein said predetermined design information comprises one or more of memory performance parameters, dimensions of said one or more memories, number of ports on each of said one or more memories, latency parameters, and power specifications; and means for composing one or more memory building blocks (i) in said one or more diffused memory regions, (ii) in said one or more gate array regions and (iii) in both said diffused memory and said gate array regions based upon said predetermined design information and said information about said programmable platform device.

18. A programmable platform device comprising:

one or more diffused memory regions and one or more gate array regions, wherein (i) one or more memory building blocks are composable in either or both of said one or more diffused memory regions and said one or more gate array regions to meet predetermined design information for one or more memories, (ii) said predetermined design information comprises one or more of memory performance parameters, dimensions of said one or more memories, number of ports on each of said one or more memories, latency parameters, and power specifications and (iii) said one or more memory building blocks are assemblable into said one or more memories.

19. The programmable platform device according to claim 18, wherein said one or more gate array regions comprise a plurality of A-cells.

20. The programmable platform device according to claim 18, wherein one or more of said one or more diffused memory regions comprise a pipelined diffused memory region.

* * * * *